3,234,200
PEPTIDES
Miklos Bodanszky, Princeton, and Saul Lande, Metuchen, N.J., assignors to Olin Mathieson Chemical Corporation, New York, N.Y., a corporation of Virginia
No Drawing. Filed July 20, 1962, Ser. No. 211,434
8 Claims. (Cl. 260—112.5)

This invention relates to new peptides, and more particularly to new nonapeptide, L-arginyl-L-phenylalanyl-L - prolyl - L - seryl - L - phenylalanylglycyl - L - prolyl-L-prolyl-L-arginine; and new intermediates useful in the preparation thereof.

The final product of this invention is a biologically active material, which possesses central nervous system depressor activity and hence can be used in the treatment of parkinsonism. The fact that the compound does have such activity is surprising, since it does not possess any of the biological activity of bradykinin.

The final product of this invention is prepared, according to the processes of this invention, from simpler peptides, as more fully detailed in the following examples.

The following examples illustrate the invention (all temperatures being in centigrade):

EXAMPLE 1

*Methyl carbobenzoxy-L-prolyl-L-prolylnitro-L-argininate*

To a solution of carbobenzoxy - L - prolyl - L - proline (10.4 g.) in acetonitrile (50 ml.) containing tri-n-butyl-amine (6.4 ml.) is added, at room temperature, ethyl chloroformate (2.6 ml.). After stirring for forty-five minutes the resultant mixed anhydride is added to methyl nitro-L-argininate. [The latter is prepared from methyl nitro-L-argininate hydrochloride (10 g.) and 1 N methanolic sodium methoxide (40 ml.) followed by removal of the methanol by evaporation in vacuo]. The suspension is stirred at room temperature for eighteen hours, the solvent is removed by evaporation in vacuo and the residue is extracted into ethyl acetate. The organic phase is washed with 1 N hydrochloric acid, water, saturated sodium bicarbonate and water, dried with anhydrous magnesium sulfate and evaporated in vacuo. The product is dissolved in methanol and precipitated with ether, yield about 11.8 g. (76%); $[\alpha]_D^{20}$ —86.7° (c. 2.2, methanol).

*Anal.*—Calcd. for $C_{25}H_{35}N_7O_8$: C, 53.5; H, 6.28; N, 17.5; —OCH, 5.53. Found: C, 54.2; H, 6.25; N, 17.3; —OCH$_3$, 5.11.

EXAMPLE 2

*Ethyl L-phenylalanylglycinate hydrobromide*

Ethyl carbobenzoxy-L-phenylalanylglycinate (1.2 g.) is dissolved in a saturated solution of hydrobromic acid in acetic acid (8 ml.) and after one hour at room temperature the volatile components are removed by lyophilization. The oily residue is triturated with acetonitrile-ether and then recrystallized from acetonitrile, yield about 0.72 g. (88%), M.P. about 134–137°, $[\alpha]_D^{24}$ +39.2° (c. 2, water).

*Anal.*—Calcd. for $C_{13}H_{19}N_2O_3Br$: C, 47.1; H, 5.78; N, 8.46; Br, 24.1. Found: C, 47.1; H, 5.90; N, 8.80; Br, 23.9.

EXAMPLE 3

(A) PREPARATION OF p-NITROPHENYL O-ACETYL-N-CARBOBENZOXY-L-SERINATE

To a solution of O-acetyl serine (29.4 g.) in 1 N bicarbonate (800 ml.) carbobenzoxy chloride (48 ml.) is added in five equal portions during a period of one-half hour, while the mixture is stirred vigorously and the temperature kept at 18–20°. After the final addition stirring is continued for another 3.5 hours and the mixture is then extracted with ether, acidified and extracted with ethyl acetate. The organic phase is dried and the solvent removed in vacuo, leaving an oily residue that is dried overnight in vacuo over sodium hydroxide. This residue (about 48 g.) is dissolved in ethyl acetate (400 ml.), the solution is cooled in an ice-water bath and p-nitrophenol (25 g.) and dicyclohexylcarbodiimide (35 g.) are added. After stirring for half an hour in the cooling bath and three hours at room temperature, acetic acid (17 ml.) is added, the stirring continued for another fifteen minutes and then the urea filtered and washed with fresh ethyl acetate. The filtrate is concentrated to dryness and the residue taken up in ether from which it readily crystallizes. The product is filtered, washed with ether, dried and recrystallized from absolute ethanol (containing 1% AcOH), yield about 40 g.; M.P. about 74–76°; $[\alpha]_D^{20}$ —42.5° (c. 2, dimethylformamide).

*Anal.*—Calcd. for $C_{19}H_{18}N_2O_8$: C, 56.71; H, 4.47; N, 6.96; OAc, 10.6. Found: C, 56.89; H, 4.62; N, 7.15; OAc, 10.7.

(B) PREPARATION OF ETHYL N-CARBOBENZOXY-O-ACETYL-L-SERYL-L-PHENYLALANYLGLYCINATE

To a solution containing ethyl L-phenylalanylglycinate hydrobromide (3.3 g.) and tri-n-butylamine (2.4 ml.) in pyridine (10 ml.), nitrophenyl N-carbobenzoxy-O-acetyl-L-serinate (4 g.) is added, and the solution is left at room temperature for three days. Addition of ethyl acetate causes the separation of a solid product which is crystallized from ethanol, yield about 3.4 g. (67%), M.P. about 172–174° (sinters at 152°); $[\alpha]_D^{24}$ —19.5° (c. 2, dimethylformamide).

*Anal.*—Calcd. for $C_{26}H_{31}N_3O_8$: C, 60.8; H, 6.08; N, 8.18. Found: C, 61.6; H, 6.03; N, 8.41.

EXAMPLE 4

*N-carbobenzoxy-L-seryl-L-phenylalanylglycine hydrazide*

Ethyl N-carbobenzoxy-O-acetyl-L-seryl-L-phenylalanylglycinate (2 g.) is dissolved in a warm solution of methanol (40 ml.) containing anhydrous hydrazine (95%+) (2 ml.). The solution is allowed to remain at room temperature for eighteen hours during which time the hydrazide separates from solution. After storing in the refrigerator, the product is isolated by filtration and recrystallized from methanol, yield about 1.9 g. (94%), M.P. about 192–196°; $[\alpha]_D^{24}$ —23.1° (c. 2, dimethylformamide).

*Anal.*—Calcd. for $C_{22}H_{27}N_5O_6$: C, 57.8; H, 5.95; N, 15.3. Found: C, 57.2; H, 6.37; N, 15.4.

EXAMPLE 5

*Methyl N-carbobenzoxy-L-seryl-L-phenylalanylglycyl-L-prolyl-L-prolylnitro-L-argininate*

Methyl carbobenzoxy - L - prolyl - L - prolylnitro - L-argininate (3.4 g.) is dissolved in acetic acid (3 ml.) and a saturated solution of hydrobromic acid in acetic acid (10 ml.) is added. After one hour at room temperature, ether is added and the solid, hygroscopic methyl L-prolyl-L-prolyl-nitro-L-argininate hydrobromide is collected by filtration, washed with ether and dried over potassium hydroxide pellets.

Carbobenzoxy-L-seryl-L-phenylalanylglycine hydrazide (2.48 g.) is dissolved in a mixture of acetic acid (15 ml.) and 1 N hydrochloric acid (10 ml.) and the solution is cooled to 0°. Sodium nitrite (0.9 g.) is added and dissolved by shaking and after ten minutes in the cold, the precipitated azide that forms is isolated by filtration and washed thoroughly with ice water. Excess water is pressed out of the filter cake and the azide is then added to an ice cold solution of the methyl L-prolyl-L-prolyl-nitro-L-argininate in dimethylformamide (10 ml.) containing triethylamine (1.2 ml.). After forty-eight hours at 4°, the solvent is removed in vacuo, the ensuing oil is dissolved in wet ethyl acetate containing a few milliliters of ethanol and then extracted with 1N hydrochloric acid and water. The organic layer is dried over anhydrous magnesium sulfate and evaporated in vacuo and the amorphous residue is washed with ether, yield about 2.6 g. (56%), M.P. sinters at about 100° and slowly melts up to 120°; $[\alpha]_D^{23}$ —51.2° (c. 1.2, dimethylformamide).

Anal.—Calcd. for $C_{39}H_{52}N_{10}O_{12}$: C, 54.9; H, 6.15; N, 16.4. Found: C, 54.8; H, 6.31; N, 16.3.

Paper chromatography (butanol-acetic acid-water 4:1:5) indicates the presence of a single component, ultraviolet absorbing and ninhydrin negative, $R_f=0.78$.

EXAMPLE 6

Carbobenzoxynitro-L-arginyl-L-phenylalanyl-L-proline

Carbobenzoxy-L-phenylalanyl-L-proline (2 g.) is dissolved in a saturated solution of hydrobromic acid in acetic acid (3 ml.). After one hour, ether is added and the precipitate, L-phenylalanyl-L-proline hydrobromide ($R_f=0.54$, butanol-acetic acid-water 4:1:5, single spot) is washed with ether and dried over potassium hydroxide pellets, yield about 1.85 g.

A mixture of carbobenzoxynitro-L-arginine (0.9 g.), triethylamine (0.55 ml.) and N-ethyl-5-phenylisoxazolium-3'-sulfonate (0.95 g.) in dimethylformamide (3 ml.) is stirred at 0° until solution is complete. About one hour is required. To this solution is added a mixture of L-phenylalanyl-L-proline hydrobromide (1.4 g.) in ice cold dimethylformamide (1.5 ml.) containing triethylamine (0.75 ml.). After stirring at 0° for one hour, the suspension is left at room temperature eighteen hours and the solvent is removed in vacuo. The oily residue is extracted into ethyl acetate and washed with 1 N hydrochloric acid and water. The organic layer is dried over anhydrous magnesium sulfate and the solvent is removed in vacuo. The amorphous residue (about 1.2 g.) crystallizes on trituration with ethyl acetate, yield about 0.95 g. (61%), M.P. about 163–165°; $[\alpha]_D^{22}$ —28.1° (c. 2.2, dimethylformamide). For analysis, the product is recrystallized from acetonitrile.

Anal.—Calcd. for $C_{28}H_{35}N_7O_8$: C, 56.3; H, 5.90; N, 16.4. Found: C, 56.4; H, 6.09; N, 16.5.

EXAMPLE 7

Nitrophenyl carbobenzoxynitro-L-arginyl-L-phenylalanyl-L-prolinate

To a solution of carbobenzoxynitro-L-arginyl-L-phenylalanyl-L-proline (0.6 g.) and nitrophenol (0.16 g.) in tetrahydrofuran (2 ml.), dicyclohexylcarbodiimide (0.22 g.) is added. After twenty-four hours at room temperature, the suspension is cooled, filtered and the filtrate is evaporated in vacuo. The oily residue is triturated with ether-ethanol and recrystallized from methanol, yield about 0.5 g. (69%), M.P. about 165–167°; $[\alpha]_D^{23}$ —33.9° (c. 2, 1% acetic acid in dimethylformamide).

Anal.—Calcd. for $C_{34}H_{38}N_8O_{10}$: C, 56.8; H, 5.33; N, 15.6. Found: C, 56.7; H, 5.18; N, 15.3.

EXAMPLE 8

Carbobenzoxynitro-L-arginyl-L-phenylalanyl-L-prolyl-L-seryl-L-phenylalanyl-glycyl-L-prolyl-L-prolylnitro-L-arginine Methyl N - carbobenzoxy - L - seryl - L - phenylalanylglycyl-L-prolyl-L-prolylnitro-L-argininate (1.3 g.) is dissolved in acetic acid (2 ml.) and acetic acid (3 ml.) saturated with hydrobromic acid is added. After two hours at room temperature, ether is added and the precipitated hexapeptide methyl ester hydrobromide is washed with ether, dried over potassium hydroxide pellets and dissolved in pyridine (2 ml.) containing triethylamine (0.51 ml.). To this solution of the hydrobromide is added nitrophenyl carbobenzoxynitro-L-arginyl-L-phenylalanyl-L-prolinate (0.97 g.) and the mixture left at room temperature for forty-eight hours. Ethyl acetate is added to the solution and the precipitate that forms is suspended in 1 N sodium hydroxide (6.3 ml.) for one hour at room temperature. Filtration, followed by acidification, produces an oil which solidifies on trituration with ethyl acetate, yield about 0.68 g. Paper chromatography (butanol-acetic acid-water 4:1:5) of the acyl nonapeptide reveals two ninhydrin negative, ultraviolet light absorbing components. Isolation of pure product is achieved by counter-current distribution (200 transfers) in the system n-butanol-acetic acid-water (4:1:5). Ultraviolet absorption at 270 mμ is employed to follow the course of the distribution. Starting from 0.3 g. of crude product, about 0.25 g. of pure material is recovered, M.P. sinters at about 140° and slowly melts up to 155°; $[\alpha]_D^{22}$ —47.0° (c. 1, dimethylformamide).

Anal.—Calcd. for $C_{58}H_{77}N_{17}O_{17}$: C, 54.2; H, 6.04; N, 18.5 Found: C, 54.9; H, 5.98; N, 18.6.

EXAMPLE 9

L-arginyl-L-phenylalanyl-L-prolyl-L-seryl-L-phenylalanylglycyl-L-prolyl-L-prolyl-L-arginine (A) The compound of Example 8, unpurified, is hydrogenated over a palladium catalyst for forty-eight hours with addition of fresh catalyst after eight and twenty-four hours. After filtration from the catalyst and lyophilization, the product is fractionated on a column of carboxymethyl cellulose (4 g.) by gradient elution (0.01 to 0.1 M ammonium acetate, pH 6.5) and finally isolated in dry form by lyophilization, yield about 40 mg. Paper electrophoresis in ammonium citrate buffer (pH 5.3) or pyridine acetate buffer (pH 4.0) reveals a single component, ninhydrin and Sakaguchi positive, migrating toward the cathode. The product is shown to be homogeneous by paper chromatography. In the system isoamyl alcohol-pyridine-water (3.5:3.5:3) only a single component is present, $R_f=0.14$, which is ninhydrin and Sakaguchi positive. Quantitative amino acid analysis of a sixteen hour 6 N hydrochloric acid hydrolysate gives the following amounts (micromoles) of amino acids: arginine, 2.06; glycine, 1.00; phenylalanine, 2.17; proline, 2:93; serine, 0.77. Theoretical ratio arginine, 2.0; glycine, 1.0; phenylalanine, 2.0; proline, 3.0; serine, 1.0.

(B) The compound of Example 8, after purification by counter-current distribution (75 mg.) is hydrogenated as described under (A). The product shows the same degree of purity as that from (A) without additional purification, yield about 35 mg.

The invention may be variously otherwise embodied within the scope of the appended claims.

What is claimed is:

1. L - arginyl - L - phenylalanyl - L - prolyl - L - seryl-L-phenylalanylglycyl-L-prolyl-L-prolyl-L-arginine.

2. Methyl carbobenzoxy - L - prolyl - L - prolyl - nitro-L-arginate.

3. Ethyl N - carbobenzoxy - O - acetyl - L - seryl - L-phenylalanylglycinate.

4. N-carbobenzoxy - L - seryl - L - phenylalanylglycine hydrazide.

5. Methyl N - carbobenzoxy - L - seryl - L - phenylalanylglycyl-L-prolyl-L-prolyl-nitro-L-arginate.

6. Carbobenzoxynitro - L - arginyl - L - phenylalanyl-L-proline.

7. Nitrophenyl carbobenzoxynitro - L - arginyl - L-phenylalanyl-L-prolinate.

8. Carbobenzoxynitro - L - arginyl - L - phenylalanyl-L - prolyl - L - seryl - L - phenylalanylglycyl - L - prolyl-L-prolylnitro-L-arginine.

References Cited by the Examiner
FOREIGN PATENTS
872,332    7/1961    Great Britain.

LEWIS GOTTS, *Primary Examiner.*

JAMES A. SEIDLECK, *Examiner.*

JACQUES M. DULIN, PERRY A. STITH,
*Assistant Examiners.*